United States Patent [19]

Ida et al.

[11] Patent Number: 6,043,728
[45] Date of Patent: Mar. 28, 2000

[54] FLAME-RESISTANT RESIN MATERIAL, FLAME RESISTANT RESIN MAGNET MATERIAL, AND ELECTRON BEAM CONTROLLER COMPRISING THE FLAME-RESISTANT RESIN MAGNET MATERIAL

[75] Inventors: Takeshi Ida; Naoshi Marutani, both of Mooka, Japan

[73] Assignees: Kaneka Corporation, Osaka; Tochigi Kaneka Corporation, Mooka, both of Japan

[21] Appl. No.: 08/995,456

[22] Filed: Dec. 22, 1997

[30] Foreign Application Priority Data

Dec. 27, 1996 [JP] Japan ..................... 8-350524
Oct. 17, 1997 [JP] Japan ..................... 9-285042

[51] Int. Cl.$^7$ ............................ H01F 1/00
[52] U.S. Cl. ................. 335/212; 335/156; 335/201; 335/217; 428/425.9; 524/405; 524/409; 524/436; 524/437
[58] Field of Search ...................... 524/436, 405, 524/409, 437; 335/212, 156, 201, 217; 430/940; 428/425.9

[56] References Cited

U.S. PATENT DOCUMENTS

| | | | |
|---|---|---|---|
| 3,560,253 | 2/1971 | Ashton | 524/409 |
| 4,397,978 | 8/1983 | McKinney et al. | 524/409 |
| 4,490,498 | 12/1984 | Yokota et al. | 524/431 |
| 4,570,140 | 2/1986 | Terunki | 335/212 |
| 4,699,743 | 10/1987 | Nakamura et al. | 524/431 |
| 4,839,128 | 6/1989 | Yoshino et al. | 524/435 |
| 5,071,894 | 12/1991 | Weil et al. | 524/405 |
| 5,472,644 | 12/1995 | Schubert | 524/405 |
| 5,714,550 | 2/1998 | Shaw | 524/405 |
| 5,742,223 | 4/1998 | Simendinger et al. | 338/21 |

FOREIGN PATENT DOCUMENTS

| | | | |
|---|---|---|---|
| 230564 | 8/1987 | European Pat. Off. | 524/409 |
| 52-39999 | 3/1977 | Japan | 524/437 |
| 54-28347 | 3/1979 | Japan | 524/437 |
| 59-221345 | 12/1984 | Japan | 524/409 |
| 60-81236 | 5/1985 | Japan | 524/409 |
| 1-201347 | 8/1989 | Japan | 524/409 |
| 2-69544 | 3/1990 | Japan | 524/409 |
| 5-170968 | 7/1993 | Japan | 524/437 |

*Primary Examiner*—Veronica P. Hoke
*Attorney, Agent, or Firm*—Armstrong, Westerman, Hattori, McLelland & Naughton

[57] ABSTRACT

Provided are non-halogen, flame-resistant, resin materials and resin magnet materials, and also electron beam controllers comprising the resin magnet materials. The resin material comprises (A) a non-halogen resin composition, (B) a metal oxide hydrate, and (C) one or both of antimony trioxide and zinc borate. The resin magnet material comprises those components (A), (B) and C), and (D) a magnetic material. In the electron beam controller, the four-pole and 6-pole convergence magnets and the two-pole purity controller magnets are made of the resin magnet materials.

18 Claims, 2 Drawing Sheets

FLAME-RESISTANT RESIN MATERIAL, FLAME RESISTANT RESIN MAGNET MATERIAL, AND ELECTRON BEAM CONTROLLER COMPRISING THE FLAME-RESISTANT RESIN MAGNET MATERIAL

FIELD OF THE INVENTION

The present invention relates to a flame-resistant resin material, a flame-resistant resin magnet material, and an electron beam controller comprising ring magnets made of the flame-resistant resin magnet material.

BACKGROUND OF THE INVENTION

Various synthetic resins are much used in various fields in our daily life. As for electric appliances, for example, many small and large synthetic resin parts are used therein. However, as being mostly made of organic materials, synthetic resin parts are combustible and give much heat of combustion. Therefore, those synthetic resin parts are problematic in that, if heated too much, they are often fired.

As for television image-receiving devices, for example, the electron beam controller to be built in the neck of the color picture tube is generally composed of synthetic resin parts, and is adjacent to the power supply member that gives much heat. Therefore, the synthetic resin magnet rings to be in the electron beam controller must be incombustible. If not, the synthetic resin part will be fired due to the heat from the power supply member. For those reasons, the electron beam controller requires high flame retardancy.

Recently, there is increasing a great demand for flame-resistant synthetic resins to be used in producing many daily necessities. At present, therefore, in planning synthetic resin parts that constitute commercial products, it is the most important factor to make the synthetic resin parts incombustible.

In order to convert combustible synthetic resin materials into incombustible ones, for example, employable are any of (1) a technique of adding flame retardants to synthetic resin materials, (2) a technique of adding inorganic fillers to synthetic resin materials, (3) a technique of blending synthetic resin materials and flame-resistant polymers, and (4) a technique of co-polymerizing synthetic resin materials with flame-resistant monomers.

In general, any of those conventional techniques have heretofore been employed in order to produce flame-resistant products that meet various flame resistance standards (for example, UL Standards in USA), while selectively using suitable flame retardants, inorganic fillers, flame-resistant polymers, or flame-resistant monomers. Of those, halogen substances have heretofore been used in most cases.

Recently, the safety standards against fire have become severer and, in addition, the generation of toxic substances in fire has become highlighted. Especially in Western countries, the recent tendency is toward the inhibition of use of the conventional, halogen-containing flame retardants, inorganic fillers, flame-resistant polymers and flame-resistant monomers, and is even toward the inhibition of use of halogen substances in synthetic resin materials themselves.

This is because halogen substances, if fired, generate toxic substances. For example, when bromine compounds are fired, they give dioxin. It is well known that dioxin has severe negative influences on the environment.

SUMMARY OF THE INVENTION

The present invention has been made in consideration of the current situation as above, and its object is to realize flame-resistant synthetic resin materials in the absence of any halogen substances that will pollute the environment. Specifically, the invention is to provide inexpensive, flame-resistant resin materials which are comprised of non-halogen substances only and which, when fired, give few toxic substances.

Another object of the invention is to provide flame-resistant resin magnet materials, which are produced by adding magnetic materials to the flame-resistant resin materials, and to provide flame-resistant, electron beam controllers which comprise the flame-resistant resin magnet materials and which are used, or example, in the neck of color TV picture tubes or projection TV picture tubes.

We, the present inventors have assiduously studied in order to attain the objects as above, and, as a result, have found flame-resistant, non-halogen resin materials, of which the flame resistance is comparable to that of conventional, halogen-containing resin materials, and have completed the invention. Non-halogen substances, which we use in our invention, have heretofore been said impracticable since they must be added to synthetic resins in large quantities in order to make the resins incombustible and since they have non-negligible influences on the base resins.

In addition, we have found that the metal oxide hydrates which we use herein are preferably defined to have a mean grain size, r, of $1 \mu m < r < \mu m$, in order to obtain better results.

Having added magnetic materials to the flame-resistant resin materials which we have obtained herein, we have additionally obtained resin magnet materials which have not only good flame resistance but also increased mechanical strength.

Having used four-pole and six-pole convergence magnets and two-pole purity controller magnets, which are made of the flame-resistant resin magnet materials, we have obtained electron beam controllers with good flame resistance.

The present invention has attained the above-mentioned objects, while providing the following (1) to (20):

(1) A flame-resistant resin material comprising (A) a non-halogen resin composition, (B) a metal oxide hydrate, and (C) antimony trioxide.

(2) The flame-resistant resin material of (1), in which the amount, x1, of the metal oxide hydrate (B) is 5 parts by weight$\leq$x1$\leq$40 parts by weight, and the amount, x2, of the antimony trioxide (C) is 0 part bv weight<x2<40 parts by weight, relative to 100 parts by weight of the non-halogen resin composition (A).

(3) A flame-resistant resin material comprising (A) a non-halogen resin composition, (B) a metal oxide hydrate, and (C') zinc borate.

(4) The flame-resistant resin material of (3), in which the amount, x1, of the metal oxide hydrate (B) is 5 parts by weight$\leq$x1$\leq$40 parts by weight, and the amount, x3, of the zinc borate (C') is 0 part by weight<x3$\leq$20 parts by weight, relative to 100 parts by weight of the non-halogen resin composition (A).

(5) A flame-resistant resin material comprising (A) a non-halogen resin composition, (B) a metal oxide hydrate, and (C") antimony trioxide and zinc borate.

(6) The flame-resistant resin material of (5), in which the amount, x1, of the metal oxide hydrate (B) is 20 parts by weight$\leq$x1$\leq$40 parts by weight, and the amount, x2, of the antimony trioxide in (C") is 20 parts by weight<x2<40 parts by weight while the amount, x3, of the zinc borate in (C") is 0 part by weight<x3$\leq$10 parts by weight, relative to 100 parts by weight of the non-halogen resin composition (A).

(7) The flame-resistant resin material any one of (1) to (6), in which the non-halogen resin material (A) is a polyamide resin.

(8) The flame-resistant resin material of any one of (1) to (7), in which the metal oxide hydrate (B) is aluminum hydroxide or magnesium hydroxide.

(9) The flame-resistant resin material of any one of (1) to (8), in which the metal oxide hydrate (B) has a mean grain size, r, of 1 $\mu$m<r<5 $\mu$m.

(10) A flame-resistant resin magnet material as prepared by adding (D) a magnetic material to a flame-resistant resin material comprising (A) a non-halogen resin composition, (B) a metal oxide hydrate, and (C) antimony trioxide.

(11) The flame-resistant resin magnet material of (10), which is comprised of from 20 to 50% by volume of the magnetic material (D) and from 50 to 80% by volume of the flame-resistant resin material and in which the amount, x1, of the metal oxide hydrate (B) is 5 parts by weight$\leq$x1$\leq$40 parts by weight, and the amount, x2, of the antimony trioxide (C) is 0 part by weight<x2<40 parts by weight, relative to 100 parts by weight of the non-halogen resin composition (A).

(12) A flame-resistant resin magnet material as prepared by adding (D) a magnetic material to a flame-resistant resin material comprising (A) a non-halogen resin composition, (B) a metal oxide hydrate, and (C') zinc borate.

(13) The flame-resistant resin magnet material of (12), which is comprised of from 20 to 50% by volume of the magnetic material (D) and from 50 to 80% by volume of the flame-resistant resin material and in which the amount, x1, of the metal oxide hydrate (B) is 5 parts by weight$\leq$x1$\leq$40 parts by weight, and the amount, x3, of the zinc borate (C') is 0 part by weight<x3$\leq$20 parts by weight, relative to 100 parts by weight of the non-halogen resin composition (A).

(14) A flame-resistant resin magnet material as prepared by adding (D) a magnetic material to a flame-resistant resin material comprising (A) a non-halogen resin composition, (B) a metal oxide hydrate, and (C") antimony trioxide and zinc borate.

(15) The flame-resistant resin magnet material of (14), which is comprised of from 20 to 50% by volume of the magnetic material (D) and from 50 to 80% by volume of the flame-resistant resin material and in which the amount, x1, of the metal oxide hydrate (B) is 20 parts by weight$\leq$x1$\leq$40 parts by weight, and the amount, x2, of the antimony trioxide in (C") is 20 parts by weight<x2<40 parts by weight while the amount, x3, of the zinc borate on (C") is 0 part by weight<x3$\leq$10 parts by weight, relative to 100 parts by weight of the non-halogen resin composition (A).

(16) The flame-resistant resin magnet material of any one of (10) to (15), in which the non-halogen resin material (A) is a polyamide resin.

(17) The flame-resistant resin material or any one of (10) to (16), in which the metal oxide hydrate (B) is aluminum hydroxide or magnesium hydroxide.

(18) The flame-resistant resin magnet material of any one of (10) to (17), in which the metal oxide hydrate (B) has a mean grain size, r, of 1 $\mu$m<r<5 $\mu$m.

(19) The flame-resistant resin magnet material of any one of (10) to (18), in which the magnetic material (D) is magnetic ferrite powder.

(20) An electron beam controller to be disposed in the neck of a color Braun tube, in which the four-pole and six-pole convergence magnets and the two-pole purity controller magnets constituting it are made of the flame-resistant resin magnet material of any one of (10) to (19).

In the invention, not only non-halogen substances are used as the flame retardants but also the resin composition materials themselves are comprised of only non-halogen substances. Therefore, even when fired, the flame-resistant resin materials of the invention will give few toxic substances. When combined with magnetic materials, the flame-resistant resin materials of the invention can be flame-resistant resin magnet materials having high mechanical strength. Using the flame-resistant resin magnet materials of the invention, electron beam controllers with high flame resistance can be produced. When the electron beam controller is disposed in the neck of color TV picture tubes, it is not fired even when heated at high temperatures by the adjacent power supply member.

Preferably, the metal oxide hydrate to be in the flame-resistant resin material of the invention is defined to have a mean grain size, r, of 1 $\mu$m<r<5 $\mu$m. The resin material comprising the thus-defined metal oxide hydrate may have higher flame resistance. This is because, if its mean grain size, r, is too small, the metal oxide hydrate shall have an enlarged specific surface area, resulting in that its kneadability with synthetic resin is poor and, as a result, in the process of injection-molding the resin material, its fluidity is unfavorably low and the producibility of molded products in the process is lowered. On the other hand, if the mean grain size, r, of the metal oxide hydrate is too large, its surface activity is poor so that the metal oxide hydrate could not be decomposed satisfactorily and could not act to make the resin material resistant to flames.

The metal oxide hydrate is combined with antimony trioxide and added to the non-halogen resin composition to give the flame-resistant resin material of the invention, in which the two, metal oxide hydrate and antimony trioxide exhibit synergistic effects. Concretely, when the resin material comprising the two is heated at 270° C., the metal oxide hydrate is decomposed to give water ($H_2O$) whereby the resin material is prevented from firing. Then when it is further heated up to 450 to 460° C. or higher, the decomposition of the metal oxide hydrate is finished while antimony trioxide begins to melt, and the resulting melt of antimony trioxide diffuses over the surface of the resin component while blocking the contact of the resin surface with air, thereby preventing the resin material from firing. As a result, the resin material of the invention satisfies the requirements in the UL Standards, as being incombustible within the entire temperature range between 270 and 700° C.

In those drawings, A is a color picture tube; 1 is an electron beam controller; 2 is a neck; 3 is a combination of four-pole convergence magnets; 4 is a combination of six-pole con vergence magnets; and 5 is a combination of two-pole purity controller magnets.

PREFERRED MODES OF CARRYING OUT THE INVENTION

The invention is described in detail hereinunder with reference to its embodiments and the drawings attached hereto.

Figure 1:
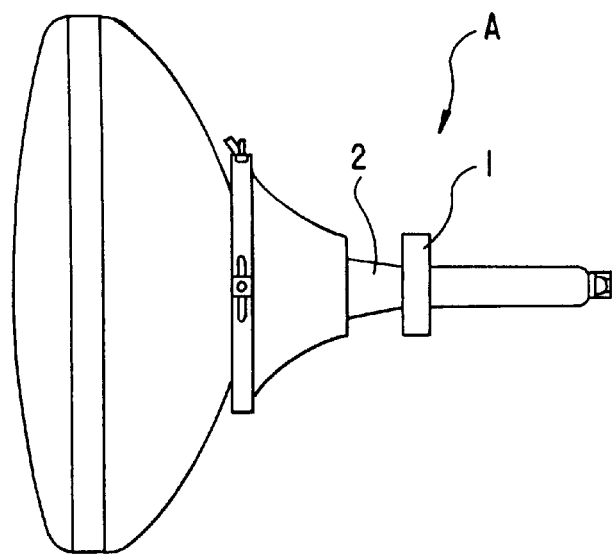
FIG. 1 shows the outline of a color picture tube.

The flame-resistant resin magnet material of the invention is, for example, formed into ring magnets to be used in the electron beam controller which is disposed in the neck 2 of the color picture tube A of a TV device, as in FIG. 1.

Figure 2:
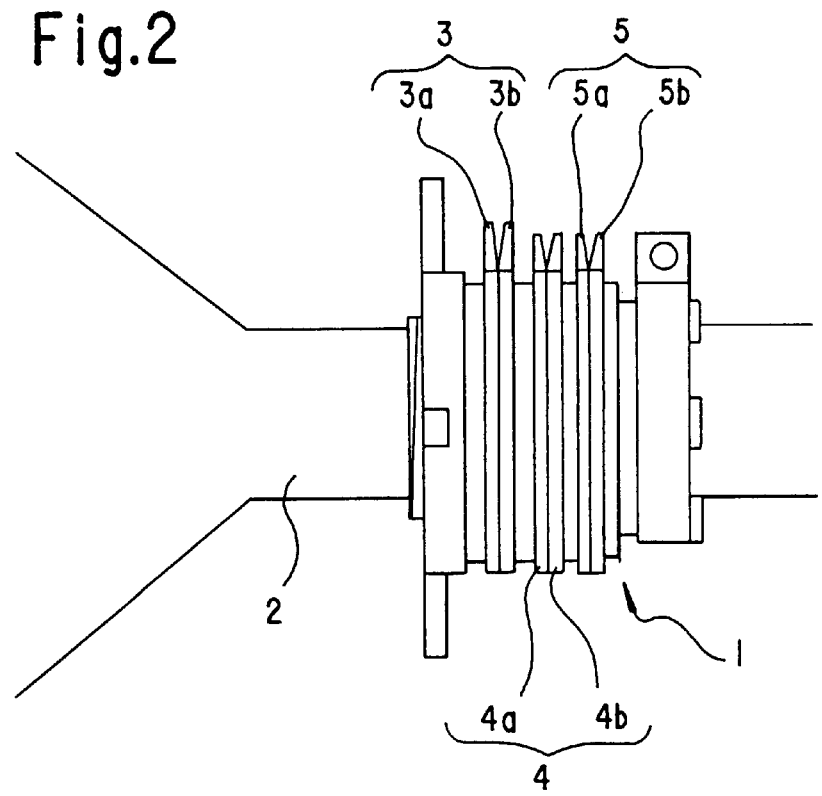
FIG. 2 shows the details of the electron beam controller of the invention in the color picture tube of FIG. 1.
Figure 3:
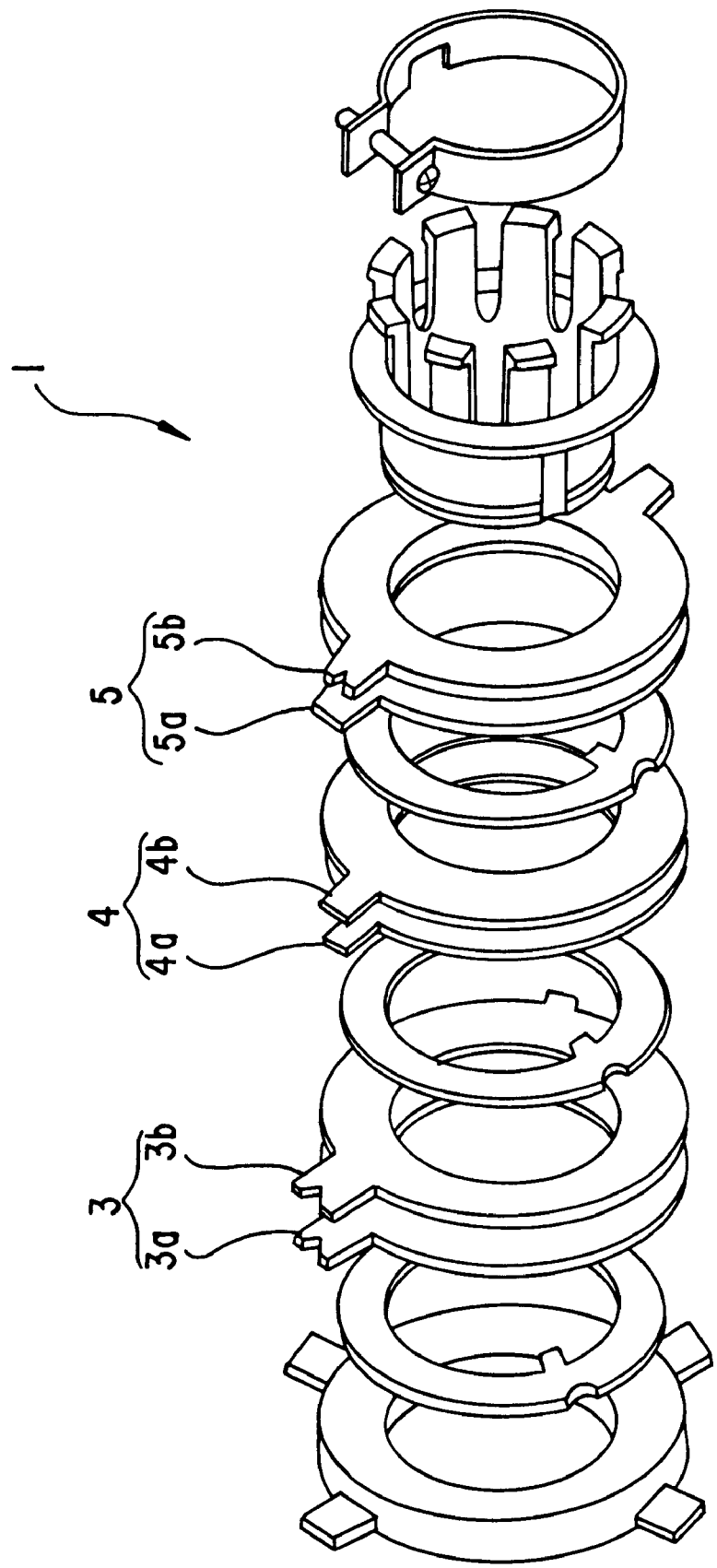
FIG. 3 is an exploded perspective view showing the electron beam controller of FIG. 2.

The electron beam controller comprises four-pole convergence magnets 3a and 3b, six-pole convergence magnets 4a and 4b, and two-pole purity controller magnets 5a and 5b, as in FIG. 2, in which the ring magents are made of the flame-resistant resin magnet material of the invention.

The flame-resistant resin magnet material is prepared by adding a magnetic material (D) to a flame-resistant resin material, in which the flame-resistant resin material comprises a non-halogen resin composition (A), a metal oxide hydrate (B), and antimony trioxide (C).

The non-halogen resin composition (A) consists essentially of a polyamide resin.

This is because polyamide resins have high heat resistance and good curability.

As the metal oxide hydrate (B), essentially used is aluminum hydroxide or magnesium hydroxide.

Preferably, the metal oxide hydrate used herein has a mean grain size, r, of $1 \mu m < r < 5 \mu m$. This is because, if its mean grain size, r, is not larger than $1 \mu m$, the metal oxide hydrate shall have an enlarged specific surface area, resulting in that its kneadability with resin is poor and, as a result, in the process of injection-molding the resin material, its fluidity is unfavorably low and the producibility of molded products in the process is lowered. On the other hand, if the mean grain size, r, of the metal oxide hydrate is not smaller than $5 \mu m$, its surface activity is poor so that the metal oxide hydrate could not be decomposed satisfactorily and could not act to make the resin material resistant to flames.

The antimony trioxide (C) may be used singly in the resin material, or alternatively, zinc borate (C') may be used singly therein in place of the antimony trioxide (C). If desired, a combination or antimony trioxide and zinc borate (C") may also be used in the resin material, in place of the antimony trioxide (C) alone.

Regarding the combination of the metal oxide hydrate (B) and the antimony trioxide (C), it is desirable that the amount, $x1$, of the metal oxide hydrate (B) is 5 parts by weight$\leq x1 \leq 40$ parts by weight, more preferably 20 parts by weight$\leq x1 \leq 40$ parts by weight, and that the amount, $x2$, of the antimony trioxide (C) is 0 part by weight$< x2 < 40$ parts by weight, more preferably 10 parts by weight$\leq x2 \leq 30$ parts by weight, relative to 100 parts by weight of the non-halogen resin composition (A). This is because, if the amount of the antimony trioxide added is larger than 30 parts by weight, the resin material will easily glow. On the other hand, if its amount added is smaller than 10 parts by weight, the antimony trioxide could not exhibit its flame-retarding ability.

Regarding the combination of the metal oxide hydrate (B) and the zinc borate (C'), it is desirable that the amount, $x1$, of the metal oxide hydrate (B) is 5 parts by weight$\leq x1 \leq 40$ parts by weight, more preferably 30 parts by weight$\leq x1 \leq 40$ parts by weight, and that the amount, $x3$, of the zinc borate (C') is 0 part by weight$< x3 < 20$ parts by weight, more preferably 10 parts by weight$\leq x3 \leq 20$ parts by weight, relative to 100 parts by weight of the non-halogen resin composition (A). This is because, if the amount of the zinc borate added is larger than 20 parts by weight, the resin material will easily glow. On the other hand, if its amount added is smaller than 10 parts by weight, the zinc borate could not exhibit its flame-retarding ability.

Regarding the combination of the metal oxide hydrate (B) and the combined antimony trioxide and zinc borate (C"), it is desirable that the amount, $x1$, of the metal oxide hydrate (B) is 5 parts by weight$\leq x1 \leq 40$ parts by weight, more preferably 20 parts by weight$\leq x1 \leq 40$ parts by weight, and that the amount, $x2$, of the antimony trioxide in (C") is 20 parts by weight$< x2 < 40$ parts by weight while the amount, $x3$, of the zinc borate in (C") is 0 part by weight$< x3 \leq 10$ parts by weight, relative to 100 parts by weight of the non-halogen resin composition (A). More desirably, in (C"), the sum of the amount, $x2$, of the antimony trioxide and the amount, $x3$, of the zinc borate is 20 parts by weight$< (x2+x3) < 40$ parts by weight. This is because, if the amount of the zinc borate to be in the combination of the metal oxide hydrate (B) and the combined antimony trioxide and zinc borate (C") is too large, the resin material will easily glow and ignite.

As the magnetic material (D), magnetic ferrite powder is used.

Regarding the content of the magnetic material (D) to be in the flame-resistant resin magnet material of the invention, it is desirable that the magnetic material accounts for from 20 to 50% by volume while the resin material comprised of the non-halogen resin composition, the metal oxide hydrate and one or both of antimony trioxide and zinc borate accounts for from 50 to 80% by volume. This is because, if the content of the magnetic material (D) is larger than 50% by volume, the resin content shall be too small, resulting in that the fluidity of the resin material is unfavorably low when the resin material is kneaded and shaped, and therefore the productivity of shaped products is lowered. On the other hand, if the content of the magnetic material (D) is smaller than 20% by volume, the magnetic force of the bond magnets made of the resin magnet material is too small so that the magnets could not satisfactorily function as convergence magnets or purity controller magnets.

The following Examples are to demonstrate the production of samples of the flame-resistant resin magnet material of the invention.

EXAMPLES 1 TO 3

In Examples 1 to 3, magnetic ferrite powder as the magnetic material (D) was added, in a ratio of 35% by volume, to a resin material comprised of polyamide resin as the non-halogen resin composition (A), aluminum hydroxide as the metal oxide hydrate (B), and antimony trioxide (C), to prepare samples of the resin magnet material of the invention, in which the amount, $x1'$, of the aluminum hydroxide was 5 parts by weight$\leq x1' \leq 40$ parts by weight, and the amount, $x2$, of the antimony trioxide was 0 part by weight$< x2 < 40$ parts by weight, relative to 100 parts by weight of the polyamide resin. The aluminum hydroxide (B) used herein had a mean grain size, r, 3 $\mu m$.

On the other hand, comparative samples of resin magnet material of Comparative Examples 1 to 4 were prepared by adding magnetic ferrite powder as the magnetic material (D), in a ratio of 35% by volume, to a resin material comprised of polyamide resin as the non-halogen resin composition (A), and flame retardants of aluminum hydroxide as the metal oxide hydrate (B) and antimony trioxide (C), in which, however, one or both of the amount, $x1'$, of the aluminum hydroxide and the amount, $x2$, of the antimony trioxide were outside the defined ranges. Concretely, in Comparative Example 1 and Comparative Example 4, $x1'$ and $x2$ were outside the scope of 5 parts by weight$\leq x1' < 40$ parts by weight and the scope of 0 part by weight$< x2 < 40$ parts by weight, respectively. In Comparative Example 2, $x1'$ was outside the scope of 5 parts by weight$\leq x1' \leq 40$ parts by weight, but x2 was within the scope of 0 part by weight<x2<40 parts by weight. In Comparative Example 3, x2 was outside the scope of 0 part by weight<x2<40 parts by weight, but x1' was within the scope of 5 parts by weight≦x1'≦40 parts by weight. The aluminum hydroxide (B) used in those Comparative Examples had a mean grain size, r, of 3 μm.

In addition, another comparative sample of resin magnet material of Comparative Example B was prepared by adding magnetic ferrite powder as the magnetic material (D), in a ratio of 35% by volume, to a conventional flame-resistant resin material comprised of 100 parts by weight of polyamide resin as the non-halogen resin composition (A), 40 parts by weight of decabromodiphenyl oxide (DBDPO) as a bromine compound (B'), and 20 parts by weight of antimony trioxide (C).

Formulations of the samples of Examples 1 to 3, Comparative Examples 1 to 4, and Comparative Example 3 are shown in Table 1 below.

TABLE 1

|  | Magnetic Powder | Polyamide Resin | Flame Retardants (wt. pts.) | |
| --- | --- | --- | --- | --- |
|  | (vol. %) | (wt. pts.) | $Sb_2O_3$ | $Al(OH)_3$ |
| Example 1 | 35 | 100 | 10 | 40 |
| Example 2 | 35 | 100 | 20 | 30 |
| Example 3 | 35 | 100 | 30 | 20 |
| Comparative Example 1 | 35 | 100 | 0 | 50 |
| Comparative Example 2 | 35 | 100 | 5 | 50 |
| Comparative Example 3 | 35 | 100 | 40 | 10 |
| Comparative Example 4 | 35 | 100 | 50 | 0 |

*$Al(OH)_3$ had a mean grain size of 3 μm.

|  | Magnetic Powder | Polyamide Resin | Flame Retardants (wt. pts.) | |
| --- | --- | --- | --- | --- |
|  | (vol. %) | (wt. pts.) | $Sb_2O_3$ | DBDPO |
| Comparative Example B | 35 | 100 | 20 | 40 |

*DBDPO: Decabromodiphenyl oxide (bromine compound)

The samples of resin magnet material of Examples 1 to 3 were separately shaped into test pieces, which were tested for their combustibility, in the manner mentioned below.

Precisely, the raw materials of each sample were weighed, put into a mixture, stirred and mixed, and the resulting mixture was pelletized through a kneader. The thus-prepared pellets were put into an injection-molding machine and molded into test pieces of 5 inches×5 inches×⅙ inches thick. Those test pieces were tested for their combustibility in accordance with the vertical combustion test of UL94.

In addition, the samples of resin magnet material of Comparative Examples 1 to 4 and Comparative Example B were shaped and tested in the same manner as above. The test data obtained are shown in Table 2 below.

TABLE 2

|  | Burn Time with Flames (sec) | Burn Time without Flames (sec) | Ignition | UL Standard |
| --- | --- | --- | --- | --- |
| Example 1 | 5 | 14 | No | V-0 |
| Example 2 | 7 | 13 | No | V-0 |
| Example 3 | 6 | 15 | No | V-0 |
| Comparative Example 1 | 8 | 25 | Yes | V-2 |
| Comparative Example 2 | 8 | 20 | Yes | V-2 |
| Comparative Example 3 | 12 | 25 | No | V-1 |
| Comparative Example 4 | 12 | 27 | No | V-1 |
| Comparative Example B | 3 | 13 | No | V-0 |

As in Table 2, the samples of Examples 1 to 3, in which the amount, x1', of the aluminum hydroxide (B) was 5 parts by weight≦x1'≦40 parts by weight, and the amount, x2, of the antimony trioxide (C) was 0 part by weight<x2< 40 parts by weight, relative to 100 parts by weight of the polyamide resin (A), all fell under the UL Standard of V-0, and had good flame resistance. As opposed to these, the samples of Comparative Examples 1 to 4 fell under the UL Standard of V-1 or V-2, and their flame resistance was not good.

Comparing the test data of the samples of Examples 1 to 3 with those of the sample of Comparative Example B comprising, as the flame retardant, a halogen substance of DBDPO as combined with antimony trioxide, , it is understood that the former are not inferior to the latter at all. Regarding the magnetic characteristic of those samples, the samples of the invention and the comparative sample STD (this comprises the conventional bromine compound as the flame retardant), it is expected that all those samples have the same magnetic characteristic since the content of the magnetic substance in those samples is the same. It is confirmed that all those samples shall have the same magnetic flux density in practical use.

As has been demonstrated herein, the flame resistance of the resin magnet material of the invention is high and comparable to that of the conventional resin magnet material comprising a halogen substance as the frame retardant.

EXAMPLES 4 AND 5

In Examples 4 and 5, magnetic ferrite powder as the magnetic material (D) was added, in a ratio of 35% by volume, to a resin material comprised of polyamide resin as the non-halogen resin composition (A), aluminum hydroxide as the metal oxide hydrate (B), and zinc borate (C'), to prepare samples of the resin magnet material of the invention, in which the amount, x1', of the aluminum hydroxide was 5 parts by weight≦x1'≦40 parts by weight, and the amount, x3, of the zinc boraze was 0 part by weight<x3≦20 parts by weight, relative to 100 parts by weight of the polyamide resin. The aluminum hydroxide (B) used herein had a mean grain size, r, of 3 μm.

On the other hand, comparative samples of resin magnet material of Comparative Examples 5 to were prepared by adding magnetic ferrite powder as the magnetic material (D), in a ratio of 35% by volume, to a resin material comprised of polyamide resin as the non-halogen resin composition (A), and flame retardants of aluminum hydroxide as the metal oxide hydrate (B) and zinc borate (C'), in which, however, one or both of the amount, x1', of the aluminum hydroxide and the amount, x3, of the zinc borate were outside the defined ranges. Concretely, in Comparative Example 5, x3 was within the scope of 0 part by weight<x3≦20 parts by weight, but x1' was outside the scope of 5 parts by weight≦x1'≦40 parts by weight. In Comparative Examples 6 and 7, x1' was within the scope of 5 parts by weight≦x1'≦40 parts by weight, but x3 was outside the scope of 0 part by weight<x3≦20 parts by weight. The aluminum hydroxide (B) used in those Comparative Examples had a mean grain size, r, of 3 μm.

Formulations of the samples of Examples 4 and 5, Comparative Examples 5 to 7, and Comparative Example B are shown in Table 3 below.

TABLE 3

|  | Magnetic Powder | Polyamide Resin | Flame Retardants (wt. pts.) | |
| --- | --- | --- | --- | --- |
|  | (vol. %) | (wt. pts.) | zinc borate | Al(OH)$_3$ |
| Example 4 | 35 | 100 | 10 | 40 |
| Example 5 | 35 | 100 | 20 | 30 |
| Comparative Example 5 | 35 | 100 | 5 | 45 |
| Comparative Example 6 | 35 | 100 | 30 | 10 |
| Comparative Example 7 | 35 | 100 | 40 | 10 |

*Al(OH)$_3$ had a mean grain size of 3 μm.

|  | Magnetic Powder | Polyamide Resin | Flame Retardants (wt. pts.) | |
| --- | --- | --- | --- | --- |
|  | (vol. %) | (wt. pts.) | Sb$_2$O$_3$ | DBDPO |
| Comparative Example B | 35 | 100 | 20 | 40 |

*DBDPO: Decabromodiphenyl oxide (bromine compound)

The samples of resin magnet material of Examples 4 and 5 were separately shaped into test pieces and tested for their combustibility in accordance with the vertical combustion test of UL94, in the same manner as above. In addition, the samples of resin magnet material of Comparative Examples 5 to 7 and Comparative Example 3 were also shaped and tested in the same manner as above. The test data obtained are shown in Table 4 below.

TABLE 4

|  | Burn Time with Flames (sec) | Burn Time without Flames (sec) | Ignition | UL Standard |
| --- | --- | --- | --- | --- |
| Example 4 | 5 | 17 | No | V-0 |
| Example 5 | 8 | 20 | No | V-0 |
| Comparative Example 5 | 5 | 32 | No | V-1 |
| Comparative Example 6 | 14 | 19 | No | V-1 |
| Comparative Example 7 | 15 | 22 | No | V-1 |
| Comparative Example B | 3 | 13 | No | V-0 |

As in Table 4, the samples of Examples 4 ant 5, in which the amount, x1', of he aluminum hydroxide (B) was 5 parts by weight≦x1'≦40 parts by weight, and the amount, x3, of the zinc borate (C') was 0 part by weight<x3≦20 parts by weight, relative to 100 parts by weight of the polyamide resin (A), all fell under the UL Standard of V-0, and had good flame resistance. As opposed to these, the samples of Comparative Examples 5 to 7 fell under the UL Standard of V-1, and their flame resistance was not good.

Comparing the test data of the samples of Examples 4 and 5 with those of the sample of Comparative Example B comprising, as the flame retardant, a halogen substance of DBDPO as combined with antimony trioxide, it is understood that the former are not interior to the latter at all. Regarding the magnetic characteristic of those samples, the, samples of the invention and the comparative sample STD (this comprises the conventional bromine compound as the flame retardant), it is expected that all those samples have the same magnetic characteristic since the content of the magnetic substance in those samples is the same. It is confirmed that all those samples shall have the same magnetic flux density in practical use.

As has been demonstrated herein, the samples of Examples 4 and 5, which are different from those of Examples 1 and 2 in that the former comprise zinc borate (C') in place of antimony trioxide (C), also have good flame resistance, and their flame resistance is comparable to the flame resistance of the conventional resin magnet material comprising a halogen substance as the flame retardant.

EXAMPLES 6 AND 7

In Examples 6 and 7, magnetic ferrite powder as the magnetic material (D) was added, in a ratio of 35% by volume, to a resin material comprised of polyamide resin as the non-halogen resin composition (A), aluminum hydroxide as the metal oxide hydrate (B), and a combination of antimony trioxide and zinc borate (C"), to prepare samples of the resin magnet material of the invention, in which the amount, x1', of the aluminum hydroxide was 25 parts by weight, the amount, x2, of the antimony trioxide was 25 parts by weight, and the amount, x3, of the zinc borate was 0 part by weight<x3≦10 parts by weight, relative to 100 parts by weight of the polyamide resin. The aluminum hydroxide (B) used herein had a mean grain size, r, of 3 μm.

On the other hand, a comparative sample of resin magnet material of Comparative Example 8 was prepared by adding magnetic ferrite powder as the magnetic material (D), in a ratio of 35% by volume, to a resin material comprised of polyamide resin as the non-halogen resin composition (A), aluminum hydroxide as the metal oxide hydrate (B) and a combination of antimony trioxide and zinc borate (C"), in which the amount of the polyamide resin, that of the aluminum hydroxide and that of antimony trioxide were the same as those in Examples 6 and 7, but the amount, x3, of the zinc borate was outside the scope of 0 part by weight<x3≦10 parts by weight. The aluminum hydroxide (B) used in Comparative Example 8 had a mean grain size, r, of 3 μm.

Formulations of the samples of Examples 6 and 7, Comparative Example 8, and Comparative Example B are shown in Table 5 below.

TABLE 5

|  | Magnetic Powder (vol. %) | Polyamide Resin (wt. pts.) | Flame Retardants (wt. pts.) | | |
| --- | --- | --- | --- | --- | --- |
|  |  |  | Al(OH)$_3$ | Sb$_2$O$_3$ | Zinc Borate |
| Example 6 | 35 | 100 | 25 | 25 | 5 |
| Example 7 | 35 | 100 | 25 | 25 | 10 |

TABLE 5-continued

| | | | | |
|---|---|---|---|---|
| Comparative Example 8 | 35 | 100 | 25 | 25 | 15 |

*Al(OH)₃ had a mean grain size of 3 μm.

| | Magnetic Powder | Polyamide Resin | Flame Retardants (wt. pts.) | |
|---|---|---|---|---|
| | (vol. %) | (wt. pts.) | Sb₂O₃ | DBDPO |
| Comparative Example B | 35 | 100 | 20 | 40 |

*DBDPO: Decabromodiphenyl oxide (bromine compound)

The samples of resin magnet material of Examples 6 and 7 were separately shaped into test pieces and tested for their combustibility in accordance with the vertical combustion test of UL94, in the same manner as above. In addition, the samples of resin magnet material of Comparative Example 8 and Comparative Example B were also shaped and tested in the same manner as above. The test data obtained are shown in Table 6 below.

TABLE 6

| | Burn Time with Flames (sec) | Burn Time without Flames (sec) | Ignition | UL Standard |
|---|---|---|---|---|
| Example 6 | 14 | 23 | No | V-0 |
| Example 7 | 14 | 26 | No | V-0 |
| Comparative Example 8 | 12 | 28 | Yes | V-2 |
| Comparative Example B | 3 | 13 | No | V-0 |

As in Table 6, the samples of Examples 6 and 7, in which the amount, x1', of the aluminum hydroxide (B) was 25 parts by weight, the amount, x2, of the antimony trioxide in (C") was 25 parts by weight, and the amount, x3, of the zinc borate in (C") was 0 part by weight<x3≦10 parts by weight, relative to 100 parts by weight of the polyamide resin (A), all fell under the UL Standard of V-0, and had good flame resistance. As opposed to these, the sample of Comparative Example 8 fell under the UL Standard of V-2, and its flame resistance was not good.

Comparing the test data of the samples of Examples 6 and 7 with those of the sample of Comparative Example B comprising, as the flame retardant, a halogen substance of DBDPO as combined with antimony trioxide, it is understood that the former are not inferior to the latter at all. Regarding the magnetic characteristic of those samples, the samples of the invention and the comparative sample STD (this comprises the conventional bromine compound as the flame retardant), it is expected that all those samples have the same magnetic characteristic since the content of the magnetic substance in those samples is the same. It is confirmed that all those samples shall have the same magnetic flux density in practical use.

As has been demonstrated herein, the flame resistance of the resin magnet material of the invention, which comprises antimony trioxide and zinc borate in a predetermined ratio, is high and comparable to that of the conventional resin magnet material comprising a halogen substance as the flame retardant.

EXAMPLES 8 TO 10

In Examples 8 to 10, magnetic ferrite powder as the magnetic material (D) was added, in a ratio of 35% by volume, to a resin material comprised of polyamide resin as the non-halogen resin composition (A), magnesium hydroxide as the metal oxide hydrate (B), and antimony trioxide (C), to prepare samples of the resin magnet material of the invention, in which the amount, x1", of the magnesium hydroxide was 5 parts by weight≦x1"≦40 parts by weight, and the amount, x2, of the antimony trioxide was 0 part by weight<x2<40 parts by weight, relative to 100 parts by weight of the polyamide resin. The magnesium hydroxide (B) used herein had a mean grain size, r, of 3.8 μm.

On the other hand, comparative samples of resin magnet material of Comparative Examples 9 to 11 were prepared by adding magnetic ferrite powder as the magnetic material (D), in a ratio of 35% by volume, to a resin material comprised of polyamide resin as the non-halogen resin composition (A), and flame retardants of magnesium hydroxide as the metal oxide hydrate (B) and antimony trioxide (C), in which, however, one or both of the amount, x1", of the magnesium hydroxide and the amount, x2, of the antimony trioxide were outside the defined ranges. Concretely, in Comparative Example 9, x1" and x2 were outside the scope of 5 parts by weight≦x1"≦40 parts by weight and the scope of 0 part by weight<x2<40 parts by weight, respectively. In Comparative Example 10, x2 was within the scope of 0 part by weight<x2<40 parts by weight, but x1" was outside the scope of 5 parts by weight<x1"≦40 parts by weight. In Comparative Example 11, x1" was within the scope of 5 parts by weight≦x1"≦40 parts by weight, but x2 was outside the scope of 0 part by weight<x2<40 parts by weight. The magnesium hydroxide (B) used in those Comparative Examples had a mean grain size, r, of 3.8 μm.

Formulations of the samples of Examples 8 to 10, Comparative Examples 9 to 11, and Comparative Example B are shown in Table 7 below.

TABLE 7

| | Magnetic Powder | Polyamide Resin | Flame Retardants (wt. pts.) | |
|---|---|---|---|---|
| | (vol. %) | (wt. pts.) | Sb₂O₃ | Mg(OH)₃ |
| Example 5 | 35 | 100 | 10 | 40 |
| Example 9 | 35 | 100 | 20 | 30 |
| Example 10 | 35 | 100 | 30 | 20 |
| Comparative Example 9 | 35 | 100 | 0 | 50 |
| Comparative Example 10 | 35 | 100 | 5 | 50 |
| Comparative Example 11 | 35 | 100 | 40 | 10 |

*Mg(OH)₃ had a mean grain size of 3.8 μm.

| | Magnetic Powder | Polyamide Resin | Flame Retardants (wt. pts.) | |
|---|---|---|---|---|
| | (vol. %) | (wt. pts.) | Sb₂O₃ | DBDPO |
| Comparative Example B | 35 | 100 | 20 | 40 |

*DBDPO: Decabromodiphenyl oxide (bromine compound)

The samples of resin magnet material of Examples 8 to 10 were separately shaped into test pieces and tested for their combustibility in accordance the vertical combustion test of UL94, in the same manner as above. The samples of resin magnet material of Comparative Examples 9 to 11 and Comparative Example B were shaped and tested also in the same manner as above. The test data obtained are shown in Table 8 below.

TABLE 8

|  | Burn Time with Flames (sec) | Burn Time without Flames (sec) | Ignition | UL Standard |
|---|---|---|---|---|
| Example 8 | 6 | 15 | No | V-0 |
| Example 9 | 7 | 13 | No | V-0 |
| Example 10 | 6 | 13 | No | V-0 |
| Comparative Example 9 | 7 | 22 | Yes | V-2 |
| Comparative Example 10 | 8 | 18 | Yes | V-2 |
| Comparative Example 11 | 11 | 21 | No | V-1 |
| Comparative Example B | 3 | 13 | No | V-0 |

As in Table 8, the samples of Examples 8 to 10, in which the amount, x1", of the magnesium hydroxide (B) was 5 parts by weight $\leq$ x1" $\leq$ 40 parts by weight, and the amount, x2, of the antimony trioxide (C) was 0 part by weight<x2<40 parts by weight, relative to 100 parts by weight of the polyamide resin (A), all fell under the UL Standard of V-0, and had good flame resistance. As opposed to these, the samples of Comparative Examples 9 to 11 fell under the UL Standard of V-1 or V-2, and their flame resistance was not good.

Comparing the test data of the samples of Examples 8 to 10 with those of the sample of Comparative Example B comprising, as the flame retardant, a halogen substance of DBDPO as combined with antimony trioxide, it is understood that the former are not inferior to the latter at all. Regarding the magnetic characteristic of those samples, the samples of the invention and the comparative sample STD (this comprises the conventional bromine compound as the flame retardant), it is expected that all those samples have the same magnetic characteristic since the content of the magnetic substance in those samples is the same. It is confirmed that all those samples shall have the same magnetic flux density in practical use.

As has been demonstrated herein, the samples of Examples 8 to 10, which are different from those of Examples 1 to 3 in that the former comprise magnesium hydroxide in place of aluminum hydroxide, also have good flame resistance, and their flame resistance is comparable to the flame resistance of the conventional resin magnet material comprising a halogen substance as the flame retardant.

EXAMPLES 1 TO 3, AND COMPARATIVE EXAMPLES 12 TO 14

Comparative samples of resin magnet material of Comparative Examples 12 to 14 were prepared in the same manner as in Examples 1 to 3, except that aluminum hydroxide having a mean grain size of 8 μm was used as the metal oxide hydrate (B). Formulations of those samples of Comparative Examples 12 to 14 are shown in Table 9 below, along with those of the samples of Examples 1 to 3, and Comparative Example 3 are shown in Table 3 below.

TABLE 9

|  | Magnetic Powder (vol. %) | Polyamide Resin (wt. pts.) | Flame Retardants (wt. pts.) | | Mean Grain Size of Al(OH)$_3$ (μm) |
|---|---|---|---|---|---|
|  |  |  | Sb$_2$O$_3$ | Al(OH)$_3$ |  |
| Example 1 | 35 | 100 | 10 | 40 | 3 |
| Example 2 | 35 | 100 | 20 | 30 | 3 |
| Example 3 | 35 | 100 | 30 | 20 | 3 |
| Comparative Example 12 | 35 | 100 | 10 | 40 | 8 |
| Comparative Example 13 | 35 | 100 | 20 | 30 | 8 |
| Comparative Example 14 | 35 | 100 | 30 | 20 | 8 |

The samples of resin magnet material of Comparative Examples 12 to 14 were separately shaped into test pieces and tested for their combustibility in accordance with the vertical combustion test of UL94, in the same manner as above. The test data obtained are shown in Table 10 below, along with the test data of the samples of Examples 1 to 3.

TABLE 10

|  | Burn Time with Flames (sec) | Burn Time without Flames (sec) | Ignition | UL Standard |
|---|---|---|---|---|
| Example 1 | 6 | 14 | No | V-0 |
| Example 2 | 7 | 13 | No | V-0 |
| Example 3 | 6 | 15 | No | V-0 |
| Comparative Example 12 | 9 | 32 | No | V-1 |
| Comparative Example 13 | 8 | 31 | No | V-1 |
| Comparative Example 14 | 9 | 31 | No | V-1 |

As in Table 10, the samples of Comparative Examples 12 to 14, which were prepared in the same manner as in Examples 1 to 3 except that aluminum hydroxide having a mean grain size of 8 μm as used, all fell under the UL Standard of V-1, and their flame resistance was not good.

As has been demonstrated herein, it is understood that, when the mean grain size, r, of the metal oxide hydrate (B), which is added to the resin material in order to make it have flame resistance, is too large, its surface activity is poor so that the metal oxide hydrate could not be decomposed satisfactorily and could not act to make the resin material resistant to flames.

The test data of samples not containing magnetic powder were not given herein. As compared with the samples containing magnetic powder, those not containing it will have lower flame resistance, when the both are comprised of the same constituent components except the magnetic powder. This is because the resin content of the latter not containing magnetic powder shall be larger than that of the former containing it.

As has been described in detail hereinabove, the invention provides flame-resistant resin materials and flame-resistant resin magnet materials comprising non-halogen substances only, and the flame resistance of those materials of the invention is comparable to that of conventional, flame-resistant resin materials comprising halogen substances. Even when fired, the resin materials of the invention give few toxic substances, and do not pollute the environment. Since the flame-resistant resin magnet material of the inventions contain magnetic substances, they have high mechanical strength. The electron beam controllers to be made of the resin magnetic materials of the invention have good flame resistance, and are favorable for environmental protection.

While the invention has been described in detail and with reference to specific embodiments thereof, it will be apparent to one skilled in the art that various changes and modifications can be made therein without departing from the spirit and scope thereof.

What is claimed is:

1. An electron beam controller to be disposed in the neck of a color Braun tube, in which the four-pole and six-pole convergence magnets and the two-pole purity controller magnets constituting it are a flame-resistant resin magnet material free of halogens, consisting essentially of:
   (A) a non-halogen polyamide resin composition;
   (B) a metal oxide hydrate of aluminum or magnesium having a mean grain size, r, of $1 \ \mu m < r < 5 \ \mu m$ and present in an amount sufficient to provide the resin material with flame retardancy but not so much that the resin material will easily glow;
   (C) at least one member selected from the group consisting of antimony trioxide and zinc borate present in an amount sufficient to provide the resin material with flame retardancy but not so much that the resin material will easily glow; and
   (D) 20% to 50% by volume of a magnetic material.

2. The electron beam controller according to claim 1, wherein said flame-resistant resin magnet material is resin magnet material prepared by adding (D) a magnetic material to said flame-resistant resin material, and wherein said resin material comprises (A) said non-halogen resin composition, (B) said metal oxide hydrate, and (C) antimony trioxide.

3. The electron beam controller according to claim 1, wherein said flame-resistant resin magnet material is comprised of from 20 to 50% by volume of the magnetic material (D) and from 50 to 80% by volume of the flame-resistant resin material and in which the amount, x1, of the metal oxide hydrate (B) is 5 parts by weight$\leq$x1$\leq$40 parts by weight, and the amount, x2, of the antimony trioxide (C) is 0 part by weight<x2<40 parts by weight, relative to 100 parts by weight of the non-halogen resin composition (A).

4. The electron beam controller according to claim 1, wherein said flame-resistant resin magnet material is a resin magnet material prepared by adding (D) a magnetic material to said flame-resistant resin material, and wherein said resin material comprises (A) said non-halogen resin composition, (B) said metal oxide hydrate, and (C) zinc borate.

5. The electron beam controller according to claim 1, wherein said flame-resistant resin magnet material is comprised of from 20 to 50% by volume of the magnetic material (D) and from 50 to 80% by volume of the flame-resistant resin material and in which the amount, x1, of the metal oxide hydrate (B) is 5 parts by weight$\leq$x1$\leq$40 parts by weight, and the amount, x3, of the zinc borate(C) is 0 part by weight<x3$\leq$20 parts by weight, relative to 100 parts by weight of the non-halogen resin composition (A).

6. The electron beam controller according to claim 1, wherein said flame-resistant resin magnet material is a resin magnet material prepared by adding (D) a magnetic material to said flame-resistant resin material, and wherein said resin material comprises (A) said non-halogen resin composition, (B) said metal oxide hydrate, and (C) antimony trioxide and zinc borate.

7. The electron beam controller according to claim 1, wherein said flame-resistant resin magnet material is comprised of from 20 to 50% by volume of the magnetic material (D) and from 50 to 80% by volume of the flame-resistant resin material and in which the amount, x1, of the metal oxide hydrate (B) is 20 parts by weight$\leq$x1$\leq$40 parts by weight, and the amount, x2, of the antimony trioxide in (C) is 20 parts by weight<x2<40 parts by weight while the amount, x3, of the zinc borate in (C) is 0 part by weight<x3$\leq$10 parts by weight, relative to 100 parts by weight of the non-halogen resin composition (A).

8. The electron beam controller as claimed in any one of claims 2 to 7, in which the metal oxide hydrate (B) is aluminum hydroxide or magnesium hydroxide.

9. The electron beam controller as claimed in any one of claims 2 to 7, in which the magnetic material (D) is magnetic ferrite powder or magnetic alnico powder.

10. An electron beam controller to be disposed in the neck of a color Braun tube, in which the four-pole and six-pole convergence magnets and the two-pole purity controller magnets constituting it are a flame-resistant resin magnet material free of halogens, consisting essentially of:
    (A) 100 parts by weight of a non-halogen polyamide resin composition;
    (B) 5 to 40 parts by weight, based on 100 parts by weight of (A), of a metal oxide hydrate of aluminum or magnesium present in an amount sufficient to provide the resin material with flame retardancy but not so much that the resin material will easily glow;
    (C) 0 part by weight<(C)<40 parts by weight, based on 100 parts by weight of (A), of at least one member selected from the group consisting of antimony trioxide and zinc borate present in an amount sufficient to provide the resin material with flame retardancy but not so much that the resin material will easily glow; and
    (D) 20% to 50% by volume of a magnetic material.

11. The electron beam controller according to claim 10, wherein said flame-resistant resin magnet material is resin magnet material prepared by adding (D) a magnetic material to said flame-resistant resin material, and
    wherein said resin material comprises (A) said non-halogen resin composition, (B) said metal oxide hydrate, and (C) antimony trioxide.

12. The electron beam controller according to claim 10, wherein said flame-resistant resin magnet material is a resin magnet material prepared by adding (D) a magnetic material to said flame-resistant resin material, and
    wherein said resin material comprises (A) said non-halogen resin composition, (B) said metal oxide hydrate, and (C) zinc borate.

13. The electron beam controller according to claim 10, wherein said flame-resistant resin magnet material is comprised of from 20 to 50% by volume of the magnetic material (D) and from 50 to 80% by volume of the flame-resistant resin material and in which the amount, x1, of the metal oxide hydrate (B) is 5 parts by weight$\leq$x1$\leq$40 parts by weight, and the amount, x3, of the zinc borate (C) is 0 part by weight<x3$\leq$20 parts by weight, relative to 100 parts by weight of the non-halogen resin composition (A).

14. The electron beam controller according to claim 10, wherein said flame-resistant resin magnet material is a resin magnet material prepared by adding (D) a magnetic material to said flame-resistant resin material, and
    wherein said resin material comprises (A) said non-halogen resin composition, (B) said metal oxide hydrate, and (C) antimony trioxide and zinc borate.

15. The electron beam controller according to claim 10, wherein said flame-resistant resin magnet material is comprised of from 20 to 50% by volume of the magnetic material (D) and from 50 to 80% by volume of the flame-resistant resin material and in which the amount, x1, of the metal oxide hydrate (B) is 20 parts by weight$\leq$x1$\leq$40 parts by weight, and the amount, x2, of the antimony trioxide in (C) is 20 parts by weight<x2<40 parts by weight while the amount, x3, of the zinc borate in (C) is 0 part by weight<x3$\leq$10 parts by weight, relative to 100 parts by weight of the non-halogen resin composition (A).

16. The electron beam controller as claimed in any one of claims 11 to 15, in which the metal oxide hydrate (B) is aluminum hydroxide or magnesium hydroxide.

17. The electron beam controller as claimed in any one of claims 11 to 15, in which the metal oxide hydrate (B) has a mean grain size, r, of 1 $\mu$m<r<1 $\mu$m.

18. The electron beam controller as claimed in any one of claims 11 to 15, in which the magnetic material (D) is magnetic ferrite powder.

* * * * *

UNITED STATES PATENT AND TRADEMARK OFFICE
CERTIFICATE OF CORRECTION

PATENT NO.: 6,043,728
DATED : March 28, 2000
INVENTOR(S): IDA et al.

It is certified that an error appears in the above-identified patent and that said Letters Patent is hereby corrected as shown below:

In claim 17 on line 6 of column 18, change ".... 1 µm<r<1 µm." to be --.... 1 µm<r<5 µm.--

Signed and Sealed this

Twenty-seventh Day of March, 2001

Attest:

NICHOLAS P. GODICI

Attesting Officer

Acting Director of the United States Patent and Trademark Office